(12) United States Patent
Poisner (10) Patent No.: US 7,941,860 B2
(45) Date of Patent: May 10, 2011

(54) APPARATUS AND METHOD FOR CONTENT PROTECTION USING ONE-WAY BUFFERS

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1612 days.

(21) Appl. No.: 11/128,526

(22) Filed: May 13, 2005

(65) Prior Publication Data

US 2006/0259431 A1  Nov. 16, 2006

(51) Int. Cl.
*G06F 7/04* (2006.01)

(52) U.S. Cl. ............... 726/27; 713/165; 713/167

(58) Field of Classification Search .................. None
See application file for complete search history.

(56) References Cited

U.S. PATENT DOCUMENTS 7,167,934 B1 * 1/2007 Dunn et al. .......... 710/52
2003/0233524 A1 * 12/2003 Poisner ............... 711/156

FOREIGN PATENT DOCUMENTS

WO  WO 0225416 A2 * 3/2002

* cited by examiner

*Primary Examiner* — Benjamin E Lanier
(74) *Attorney, Agent, or Firm* — Caven & Aghevli LLC

(57) ABSTRACT

Method and apparatus for content protection using one-way buffers. In one embodiment, the method includes storage of content decrypted by a host processor within a reserved range of memory. In one embodiment, a peripheral device requires the host processor to decrypt the received content for playback by the peripheral device. The decrypted content is stored within a reserved range of memory that is not accessible by malicious software. Hence, content is transferred from the reserved range of memory to a device driver of the peripheral device. In one embodiment, access to the reserved range of memory consists of write-only access by the host processor and read-only access by the peripheral device. In one embodiment, prior to storage of the content within the reserved range of memory, the content is re-encrypted prior to storage and decryption prior to transfer to the peripheral device. Other embodiments are described and claimed.

7 Claims, 8 Drawing Sheets

APPARATUS AND METHOD FOR CONTENT PROTECTION USING ONE-WAY BUFFERS

FIELD

One or more embodiments relate generally to the field of integrated circuit and computer system design. More particularly, one or more of the embodiments relate to a method and apparatus for content protection using one-way buffers.

BACKGROUND

The proliferation of the Internet has led to the creation of a new form of commerce, generally referred to as Internet, or electronic, commerce (e-commerce). E-commerce enables users to sell and purchase items from a worldwide community connected via the Internet. This added simplicity, coupled with the continually reduced costs and increasing processor speed of modern day computers, has led to the inclusion of a personal computer (PC) in many homes throughout the world. Unfortunately, the proliferation of PCs within homes throughout the world, as well as the use of such PCs for e-commerce, often results in the storage of sensitive information within a computer.

As a result, computer users become susceptible to rogue agents, which may desire to gain access to secure information loaded in their personal computers. To combat the various rogue agents from gaining access to the secure information, many computer systems employ some form of cryptography to prevent access to sensitive information. As known to those skilled in the art, cryptography provides a technique for keeping information secret, for determining that that information has not been tampered with and for determining who authored pieces of information.

One form of cryptography involves public/private key systems. Public/private key systems encrypt information prior to transmission using a public key of the recipient that is decrypted using a private key that is only known to the recipient of the encrypted information. However, once the sensitive information arrives at its destination, the information is often decrypted and stored in a clear format. In other words, the sensitive information is generally not maintained in a secure format at its destination. As a result, during operation of a PC, a rogue agent could possibly gain access to the PC and access the sensitive information.

Furthermore, the proliferation of e-commerce has led to the availability of media applications, such as motion pictures and music, which may be downloaded to a PC for one time use or for use for a predetermined period of time. Unfortunately, without some mechanism for protecting the contents of such media applications from access by rogue agents, e-commerce involving media applications may be prohibitive to the media providers. As a result, media content, providers may be reluctant to create high quality media for content providing applications when such content may be susceptible to rogue agents.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for content protection using one-way buffers are described. In one embodiment, the method includes storage of content decrypted by a host processor within a reserved range of memory. In one embodiment, this content is required for playback by a peripheral device and thus requires the host processor to decrypt the received encrypted content to enable playback by the peripheral device. Accordingly, content is transferred from the reserved range of memory to a peripheral device or a device driver of the peripheral device. In one embodiment, access to the reserved range of memory consists of write-only access by the host processor and read-only access by the peripheral device. Accordingly, decrypted content is stored within a reserved range of memory that is not accessible by malicious software. In one embodiment, prior to storage of the content within the reserved range of memory, the content is re-encrypted prior to transfer to the peripheral device.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

System

Figure 1:
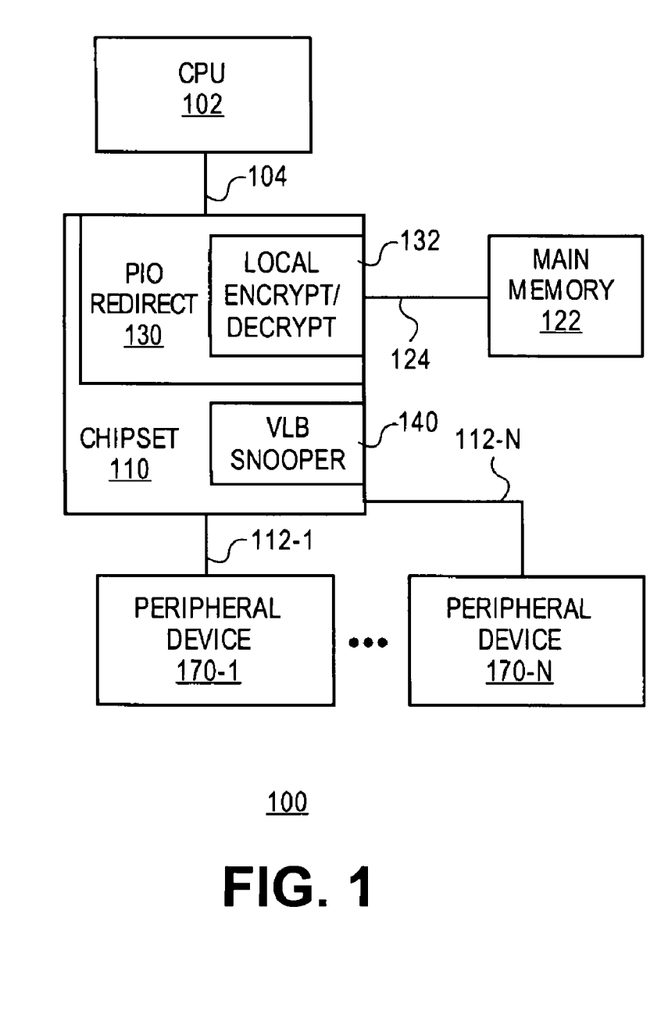
FIG. 1 is a block diagram illustrating a computer system for content protection using one-way buffers, in accordance with one embodiment.

FIG. 1 is a block diagram illustrating a computer system 100 for providing content protection using a one-way buffer, in accordance with one embodiment. As described herein, a "one-way buffer" refers to a reserved range of memory that is unknown to the operating system (OS), wherein access to the reserved range of memory is limited to a host agent and a request agent; the host agent is assigned write-only access and the request agent is assigned read-only access to the reserved range of memory. In one embodiment, a host processor (host agent) performs decryption of received content to enable playback of the content by a peripheral device (request agent). As further described herein, the "one-way buffer" may be referred to as a virtual local buffer (VLB), which stores the decrypted content. As described herein, the term "content" includes, but is not limited to, digital audio content, digital video content or other like digital content, which is desirable for playback or viewing by a user.

Representatively, computer system 100 may comprise a processor system interconnect (e.g., front-side bus (FSB)) 104 for communicating information between a host processor (CPU) 102 and a chipset 110. As described herein, the term "chipset" is used to describe collectively, the various devices coupled to CPU 102 to perform desired system functionality. As described herein, the term "interconnect" is defined to include a point-to-point interconnection between devices, including a multi-drop bus where more than two chips are joined to the same semiconductor or other like interconnect for enabling communication between the various devices and components on a motherboard.

In one embodiment, chipset 110 includes a memory controller for enabling read-access and write-access from main memory 122, which is coupled to chipset 110 via interconnect 124. As described herein, main memory 122 refers to both volatile random access memory (RAM), in which data must be periodically refreshed, such as dynamic RAM (DRAM) and volatile RAM, in which data is not periodically refreshed, such as, for example, static random access memory (SRAM). As described herein, main memory 122 may include, but is not limited to, DRAM, SRAM, synchronous DRAM (SDRAM), double data rate (DDR), SDRAM (DDR-SDRAM), Rambus DRAM (RDRAM) or any device capable of supporting high-speed volatile storage of data.

Representatively, chipset 110 is coupled to peripheral devices 170 (170-1, . . . , 170-N) via peripheral interconnect 112 (112-1, . . . , 112-N). As described herein, the term "peripheral device" may include any input/output (I/O) device including, but not limited to, graphics, such as a monitor, a hard drive, CDROM, audio device or other like peripheral device. As described herein, the CPU 102 may be referred to as a "host agent" and peripheral devices 170 may be referred to as "request agents." As described herein, an "agent" refers to any device or component coupled to chipset 110, which may arbitrate for ownership of an interconnect coupling the device to chipset 110 to request some system functionality, such as reading or writing to main memory 122.

In one embodiment, chipset 110 may include an integrated memory controller for handling read and write access to main memory 122, as requested by the various agents coupled to chipset 110. However, in an alternate embodiment, a memory controller may be integrated within CPU 102 such that main memory 122 is coupled directly to CPU 102 via an interconnect. In one embodiment, chipset 110 includes virtual local buffer (VLB) snooper 140, as well as programmed input/output (I/O) (PIO) redirect block 130. In one embodiment, such components may be included within a memory controller of chipset 110. In an alternate embodiment, components 130 and 140 of chipset 110 may be integrated within a memory controller provided by CPU 102.

In one embodiment, a user of system 100 may desire playback of content using a peripheral device 170. The content may be received from a content provider within a storage device in an encrypted form using a cryptographic key provided with the storage device. Details regarding decryption of the received content are not described herein to avoid obscuring details of the invention, but may be performed by trusted decryption software using conventional decryption techniques while remaining within the embodiments described.

Conventionally, playback of content using a peripheral device 170 requires decryption of the content and storage of that content within a buffer accessible by a controller within the peripheral device or an I/O controller provided by chipset 110. Conventionally, this controller requires the decrypted content to be stored within a data buffer accessible by the controller or a device driver associated with the peripheral device. Unfortunately, decrypted content within the data buffers can easily be read by malicious software to gain access to the decrypted content.

Figure 2:
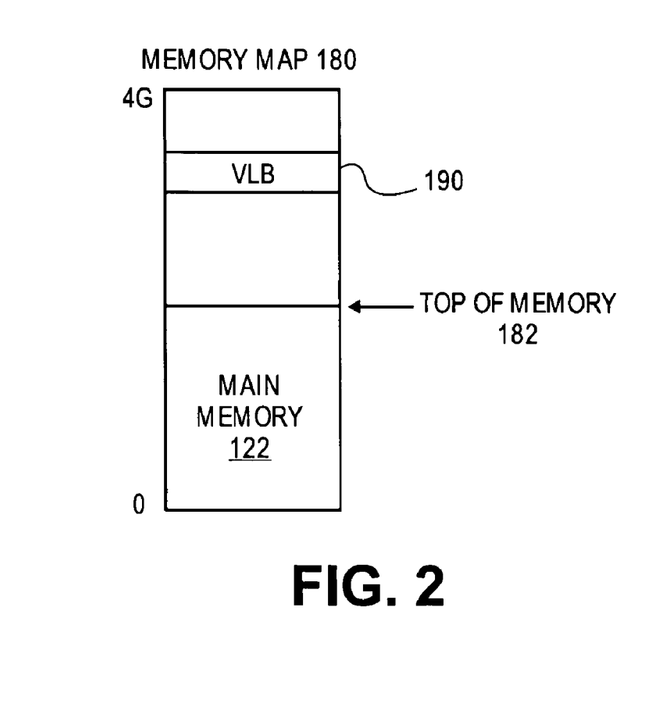
FIG. 2 is a block diagram illustrating a memory layout including a one-way virtual local buffer, in accordance with one embodiment.

Accordingly, as illustrated in FIG. 2, in one embodiment, a virtual local buffer (VLB) 190, or one-way buffer, is assigned to a peripheral device to securely store decrypted content. In one embodiment, VLB snooper block 140 (FIG. 1) detects the setting of the base address register (BAR) by plug-and-play software to a range not mapped to main memory to provide a memory address space above top of memory 182. In one embodiment, VLB snooper block 140 (FIG. 1) maps the assigned memory address space to a reserved range of memory to establish VLB 190, as shown in FIG. 2, in accordance with one embodiment. In one embodiment, VLB 190 is contained within a reserved range of memory that is unknown by the operating system (OS), and is protected by a memory controller to prohibit access thereto by malicious software, as well as other system components.

In one embodiment, VLB 190 is configured as a one-way buffer within a reserved range of memory, in which read-only access is granted to only a request agent (peripheral device 170-1) and write-only access is granted to only a host agent (CPU 102). Accordingly, in one embodiment, playback of content by a peripheral device 170-1 requires decryption of such content using CPU 102. As described herein, CPU 102 may be referred to as a "host agent," which is performing decryption of content for a peripheral device, such as peripheral device 170-1. According to conventional techniques, the decryption software executing with CPU 102 would store decrypted content to data buffers within main memory and assigned to the respective peripheral device.

In one embodiment, trusted decryption software executing within CPU 102 directs CPU 102 to decrypt encrypted content received from a manufacturer. In one embodiment, the protected decryption software directs the CPU to perform a programmed I/O transfer of the decrypted content to a portion of a memory address space assigned to a peripheral device that is to playback the decrypted content. In an alternative embodiment, the trusted decryption software may issue a memory allocation request to the OS to request a memory buffer. In response, the OS allocates a portion of memory for the trusted decryption software and provides a base address and a size of the buffer to the trusted decryption software.

In accordance with this embodiment, the trusted decryption software may communicate this information to chipset 110 by storing the base address and size of the buffer within a configuration register (not shown) of chipset 110. In accordance with this embodiment, chipset 110 may direct, for example, an integrated memory controller to configure the assigned range of memory as a one-way buffer to form VLB 192 below the top of memory 182, wherein write-access to the buffer is limited to the CPU and read-access is limited to the peripheral device. In an alternative embodiment, chipset 110 directs a memory controller to map the assigned memory range to VLB 190.

In one embodiment, a programmed I/O (PIO) redirect block 130 detects that the CPU is performing a programmed I/O transfer to an assigned portion of a memory address space that is mapped to a reserved range of memory including VLB 190/192. In one embodiment, rather than transmitting the decrypted content to data buffers within main memory 122 that are accessible by any peripheral device, the decrypted content is stored within VLB 190/192 to prohibit access to the decrypted content by malicious software or other rogue agents. In an alternative embodiment, PIO redirect blocks maps buffers allocated to trusted decryption software to VLB 190 or converts the buffers into a one-way buffer as VLB 192, below top of memory 182.

In one embodiment, PIO redirect block 130, in addition to redirecting the decrypted content includes local encrypt/decrypt block 132 to re-encrypt the decrypted content using a session key generated by, for example, a memory controller. In one embodiment, the use of a session key prohibits the need for non-volatile storage to store the session key. In one embodiment, the peripheral device requests content from VLB 190 using a device driver of the peripheral device that is granted bus master access, which enables the device driver to directly access main memory 122 via chipset 110. In one embodiment, the chipset ignores a direct memory access (DMA) request to VLB 190 unless a device ID associated with the DMA requests matches a device ID assigned read-only access to VLB 190.

Figure 3:
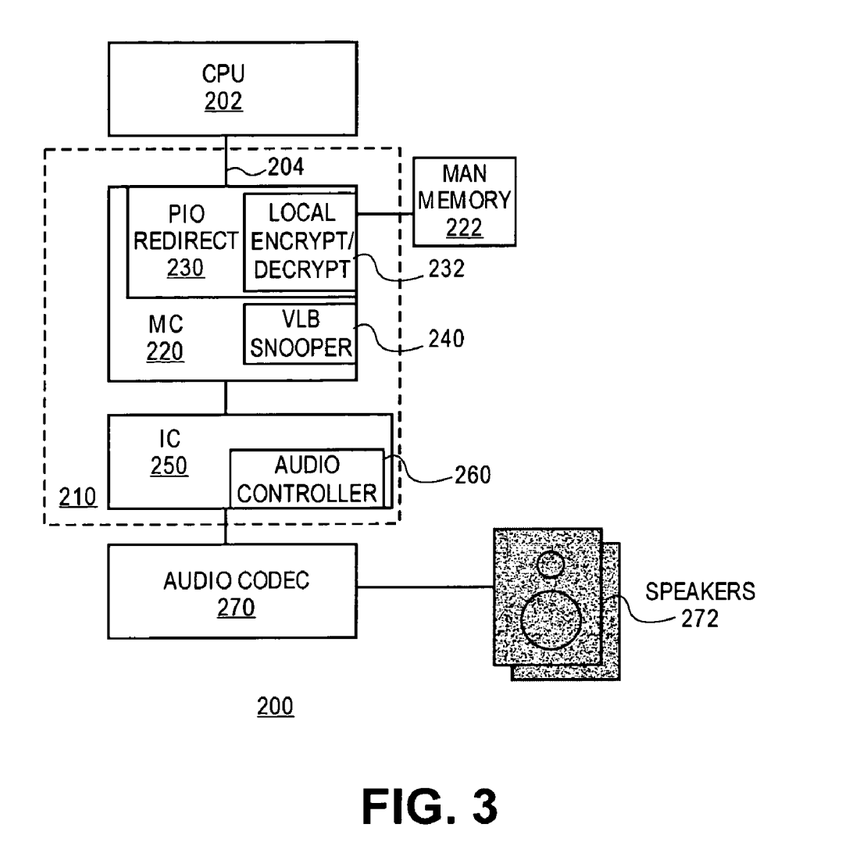
FIG. 3 is a block diagram illustrating a computer system for audio content protection using one-way buffers, in accordance with one embodiment.
Figure 4:
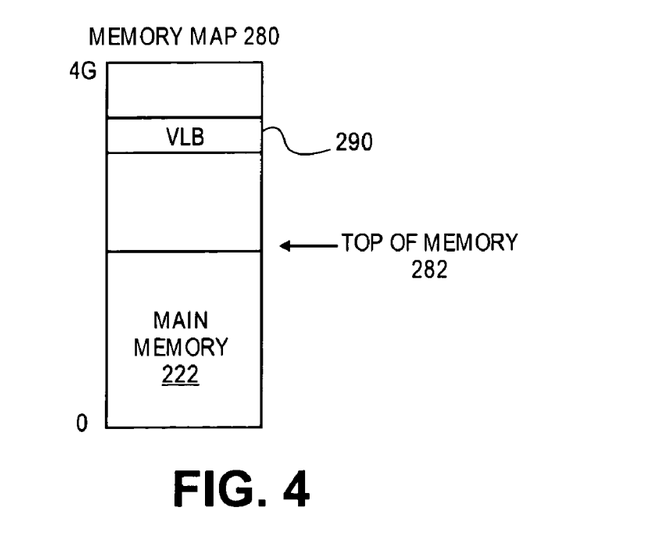
FIG. 4 is a block diagram illustrating a memory map including a virtual local buffer, in accordance with one embodiment.

FIG. 3 is a block diagram illustrating computer system 200 for audio content protection using a one-way buffer, in accordance with one embodiment. Conventionally, audio controller 260 acts as a DMA engine for providing decrypted content to audio codec 270, which decodes audio content for playback by speakers 272. In one embodiment, VLB snooper 240 detects the setting of a base address register (BAR) of audio codec 270 to assign a memory address space to audio codec 270. In response to setting of the BAR, snooper 240 establishes a virtual local buffer or VLB 290 within a reserved range of memory, as illustrated in FIG. 4, by memory map 280. In an alternative embodiment, a range of memory provided by an OS in response to a memory allocation request may be converted into a one-way buffer as VLB 292, below the top of memory 282.

Accordingly, in contrast to conventional techniques, which store the decrypted content within data buffers of main memory 222 that are accessible by malicious software, CPU 202 issues a programmed I/O transfer of the decrypted content to the assigned memory address space of audio codec 270. In response, PIO redirection block 230 redirects the decrypted content to a one-way buffer or VLB 290 within a reserved range of memory that is not accessible by malicious software.

As indicated above, VLB 290/292 is referred to as a one-way buffer since a host agent, or CPU 202, and a request agent, or audio controller 260, are the only components of computer system 200 with access to VLB 290/292. Specifically, CPU 202 is limited to write-only access of VLB 290/292 and audio codec 270 is limited to read-only access of VLB 290/292. In one embodiment, local encrypt/decrypt block 232 re-encrypts decrypted content from CPU 202 prior to storage with VLB 290/292. In response to a DMA request from a device driver of audio codec 270, local encrypt/decrypt blocks 232 also decrypts content read from VLB 290/292 prior to transfer of the content to audio codec 270 for playback via speakers 272.

In one embodiment, a length of VLB 290/292 is configured to reduce the frequency required for populating of VLB 290/292 by CPU 202 to enable playback by audio codec 270 of the audio content via speakers 272. In one embodiment, for example, VLB 290/292 is sized to enable a six-channel audio system with 32-bit samples and 96 kilo samples per second to store 115 kilobytes or a 50-millisecond buffer.

In one embodiment, the local encrypt/decrypt block 232 re-encrypts content prior to storage within VLB 290/292 to provide additional security. The encryption key, or session key, used to encrypt and decrypt the content can be generated by memory controller (MC) 220 and changed frequently. Accordingly, the encryption key is not burnt into MC 220, for example, by a manufacturer, to avoid the need for non-volatile storage since the key is never exposed. Accordingly, such additional encryption prohibits the snooping of the memory interconnect 224 or the reading of VLB 290/292 via dual ported, dual in-line memory modules (DIMM).

Figure 5:
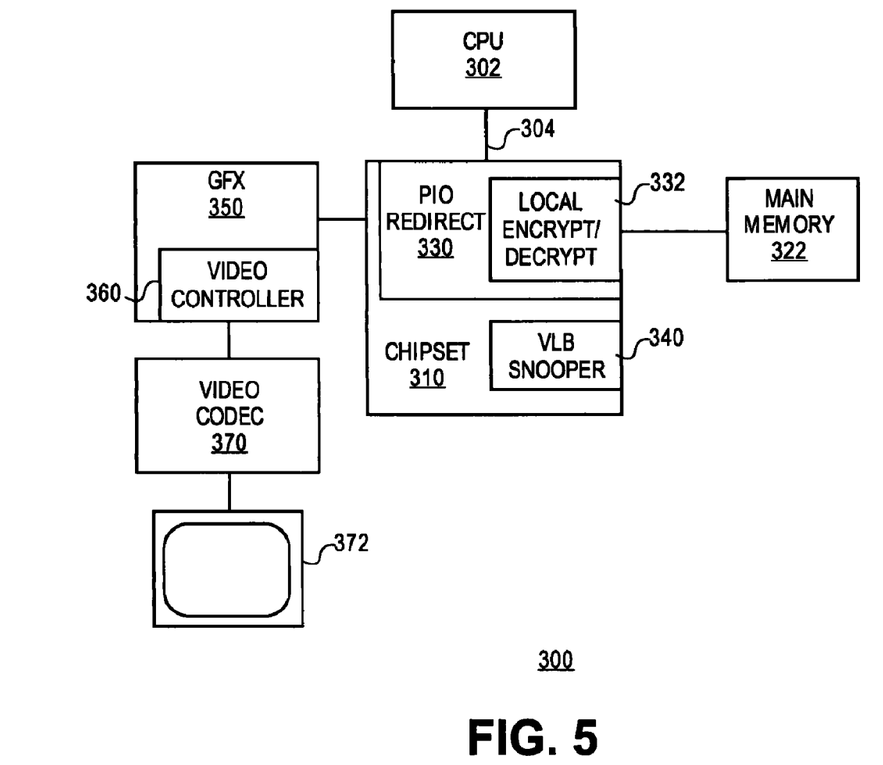
FIG. 5 is a block diagram illustrating a computer system for video content protection, in accordance with one embodiment.

FIG. 5 is a block diagram of a computer system 300 for video content protection using a one-way buffer according to one embodiment. Representatively, the chipset 310 is coupled to graphics block 350. In one embodiment, graphics block 350 includes, but is not limited to, an accelerated graphics port (AGP) or other follow on graphics port, to provide graphics support to computer system 300. Representatively, graphics block 350 includes a video controller 360 coupled to video codec 370 for playback of visual content via display 372.

Figure 6:
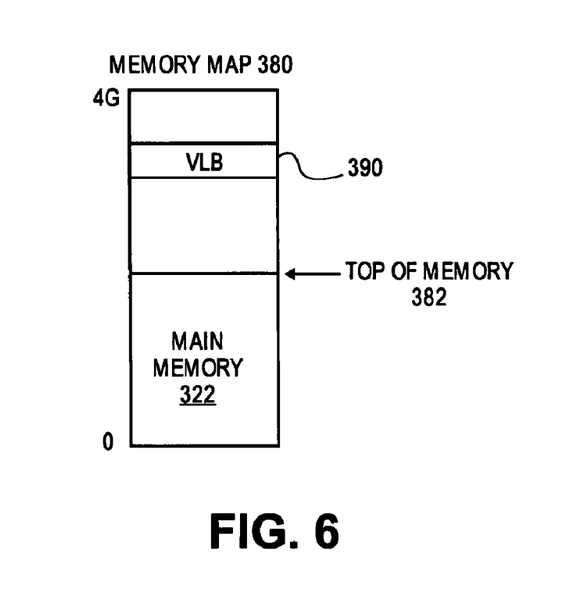
FIG. 6 is a diagram illustrating a memory map including a virtual local buffer, in accordance with one embodiment.

In one embodiment, video codec 370 includes logic for decoding of decrypted video content, as well as embedded audio content, for playback of video and sound via display 372, which includes speakers (not shown). In one embodiment, VLB snooper 340 detects the setting of a base address register (BAR) of video codec 370 to assign a memory address space to video codec 370. In response to setting of the BAR, snooper 340 establishes a virtual local buffer or VLB 390 within a reserved range of memory, as illustrated in FIG. 6, by memory map 380. In an alternative embodiment, a range of memory provided by an OS in response to a memory allocation request may be converted into a one-way buffer as VLB 392, below the top of memory 382.

In the embodiment described, the trusted decryption software directs CPU 302 to decrypt received encrypted content from a content provider. In one embodiment, the decrypted content is provided to video controller 360 via a programmed I/O transfer to a memory address space assigned to the video code 370. In response to the programmed I/O transfer by CPU 302, PIO redirect block 330 redirects the decrypted content to VLB 390/392 within the reserved range of memory. As the video codec 370 is granted bus master access, the video codec 370 may issue a DMA request to chipset 310. If the device ID associated with the video codec 370 matches the device ID assigned read-only access to VLB 390/392, chipset 310 provides content read from VLB 390 to video codec 370 for playback via display 372.

As described above, local encrypt/decrypt block 332 may be used to provide additional security to store encrypted content within VLB 390/392 using a session encryption key, which is changed frequently to obviate the need for non-volatile storage of the session key or burning of the session key during manufacture of computer system 300. Procedural methods for implementing embodiments of the invention are now described.

Operation

Figure 7:
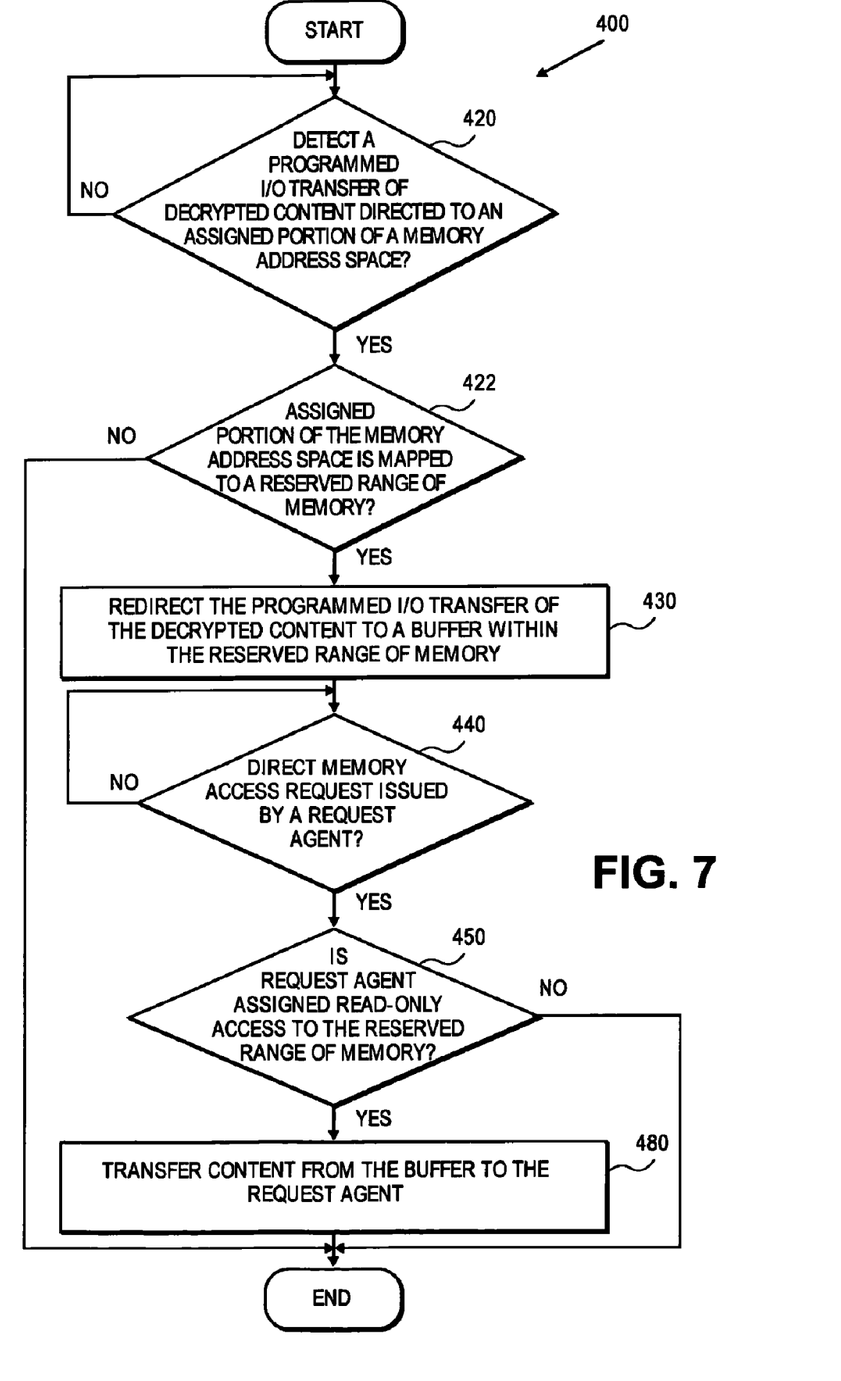
FIG. 7 is a flowchart illustrating a method for content protection using a one-way buffer, in accordance with one embodiment.

FIG. 7 is a flowchart illustrating a method for content protection using a one-way buffer, in accordance with one embodiment. At process block 420, it is determined whether a programmed I/O transfer of decrypted content is detected that is directed to an assigned portion of a memory address space. When the transfer is directed to an assigned portion of a memory address space, at process block 422, it is determined whether the assigned portion of the memory address space is mapped to a reserved range of memory, including for example, a one-way or virtual local buffer, in accordance with one embodiment. If the memory address space is mapped to the reserved range of memory, at process block 430, the programmed I/O transfer of the decrypted content is redirected to a buffer within the reserved range of memory, for example, as illustrated with reference to FIGS. 1-6.

As described above, the buffer within the reserved range of memory, referred to as a VLB or one-way buffer, is limited to one-way access by a host agent, which is granted write-only access to the buffer, and a request agent, which is granted read-only access to the buffer. Accordingly, at process block 440, it is determined whether a direct memory access request (DMA) is issued by a request agent e.g., a peripheral device). When such is detected, at process block 450, it is determined whether the request agent is assigned read-only access to the reserved range of memory. If the request agent has access to the reserved range of memory, at process block 480, content is transferred from the buffer to the request agent to enable playback of the content for a user via the request agent.

Figure 8:
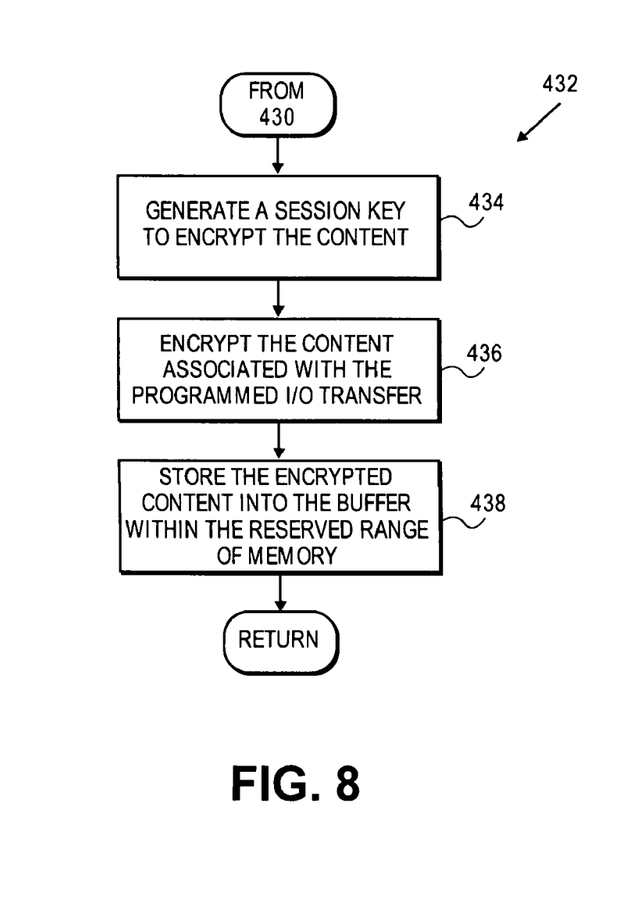
FIG. 8 is a flowchart illustrating a method for encrypting content prior to the storage of the content within a one-way buffer, in accordance with one embodiment.

FIG. 8 is a flowchart illustrating a method 432 for encryption of decrypted content prior to storage of the decrypted content within a one-way, or virtual local buffer, located within a reserved range of memory, in accordance with one embodiment. At process block 434, a session key is generated to encrypt the content. In one embodiment, this may be performed using an encryption/decryption block, for example, as shown in FIGS. 1, 3 and 5. At process block 436, the content associated with the programmed I/O transfer is encrypted using the generated session key. At process block 438, the decrypted content is re-encrypted content and stored into a VLB buffer within the reserved range of memory. As indicated above, such encryption may be performed to provide additional security to prohibit snooping of a memory interconnect between a chipset and main memory, as well as access to such content via a dual-ported, dual in-line memory module (DIMM).

Figure 9:
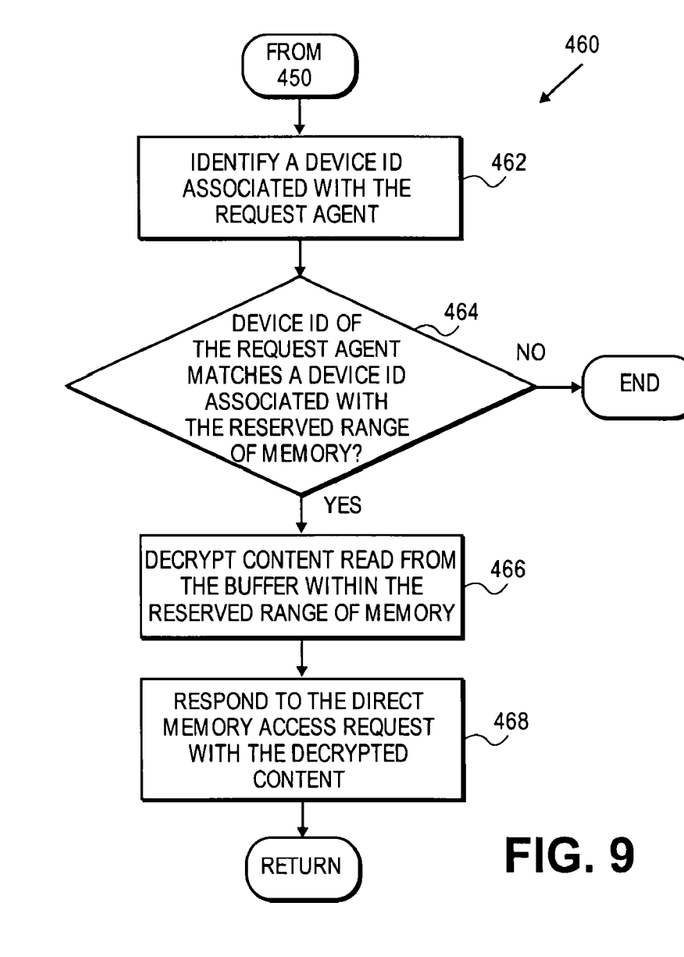
FIG. 9 is a flowchart illustrating a method for decrypting content read from a one-way buffer according to a direct memory access request issued by a peripheral device, in accordance with one embodiment.

FIG. 9 is a flowchart illustrating a method 460 for decrypting content read from a VLB, or one-way buffer, in response to a DMA request issued by a request agent with read-only access to the VLB, or one-way buffer, in accordance with one embodiment. At process block 462, a device ID associated with the request agent is identified. Once identified, at process block 464, it is determined whether the device ID of the request agent matches a device ID associated with the reserved range of memory. If a match is detected, at process block 466, content read from the buffer, in response to the DMA request issued by the request agent, is decrypted. Once decrypted, at process block 468, the DMA request is responded to with the decrypted content.

Figure 10:
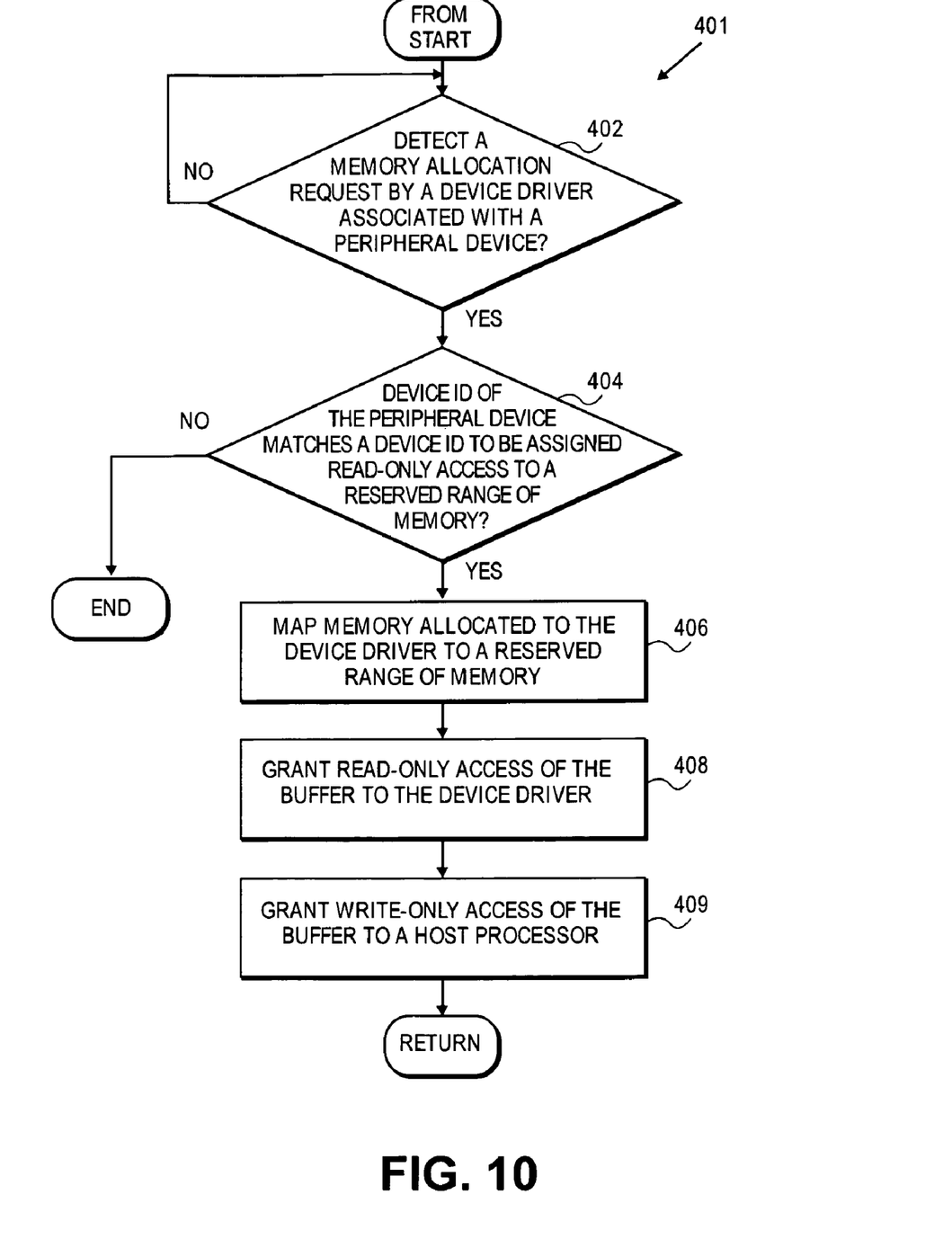
FIG. 10 is a flowchart illustrating a method for allocating a one-way buffer within a reserved range of memory for a peripheral device, in accordance with one embodiment.

FIG. 10 is a flowchart illustrating a method 401 for establishing a virtual local, or one-way buffer, for storage of content to provide protection of the content, in accordance with one embodiment, for example, as performed by VLB snooper block as shown in FIGS. 1, 3 and 5. At process block 402, it is determined whether a memory allocation request by a device driver associated with a peripheral device is detected. Once detected, at process block 404, it is determined whether a device ID of the peripheral device matches a device ID assigned read-only access to the reserved range of memory. If a match is detected, at process block 406, memory allocated to the device driver is mapped to a reserved range of memory. Once mapped, the one-way buffer is generated by granting read-only access of the buffer to the device driver at process block 408 and granting write-only access of the buffer to a host processor at process block 409, in accordance with one embodiment.

In an alternative embodiment, the OS allocates a portion of memory for the trusted decryption software and provides a base address and a size of the buffer to the trusted decryption software. In accordance with this embodiment, the trusted decryption software may communicate this information to a chipset (e.g., chipset 110 of FIG. 1) by storing the base address and size of the buffer within a configuration register (not shown) of chipset 110. In accordance with this embodiment, chipset 110 may direct, for example, an integrated memory controller to configure the assigned range of memory as a one-way buffer to form VLB 192 below the top of memory 182, wherein write-access to the buffer is limited to the CPU and read-access is limited to the peripheral device.

Figure 11:
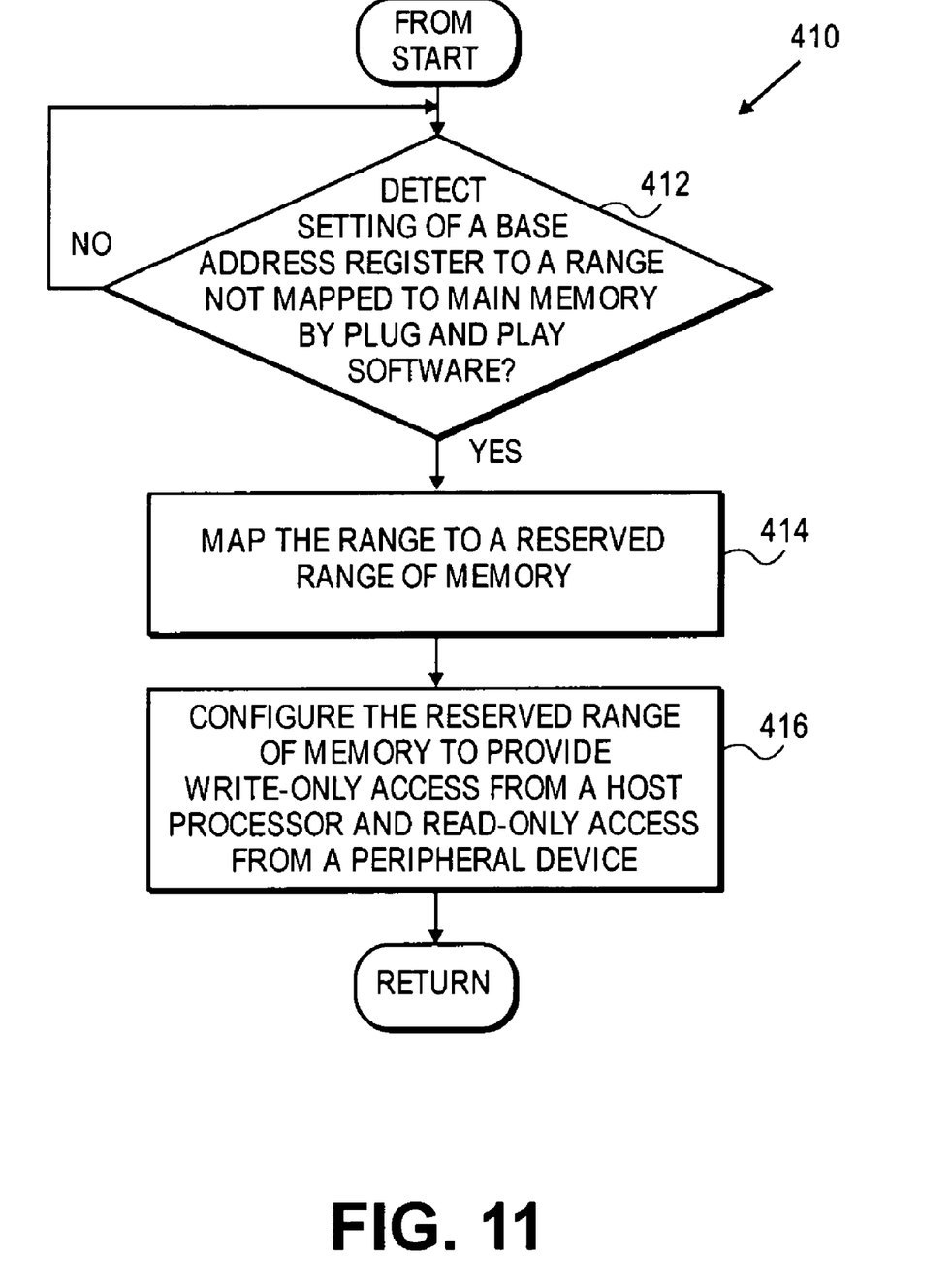
FIG. 11 is a flowchart illustrating a method for establishing a one-way buffer within a reserved range of memory, in accordance with one embodiment.

FIG. 11 illustrates a flowchart including a method 410 for establishing a one-way buffer, or VLB, for temporary storage of decrypted content to enable playback by a peripheral device or request agent according to one embodiment. At process block 412, it is determined whether setting of a base address register to a range not mapped to memory by plug-and-play software is detected. Once detected, at process block 414, the range is mapped to a reserved range of memory. At process block 416, a one-way buffer is established by configuring the reserved range of memory to provide write-only access to a host processor, or host agent, and read-only access to a peripheral device or request agent.

Figure 12:
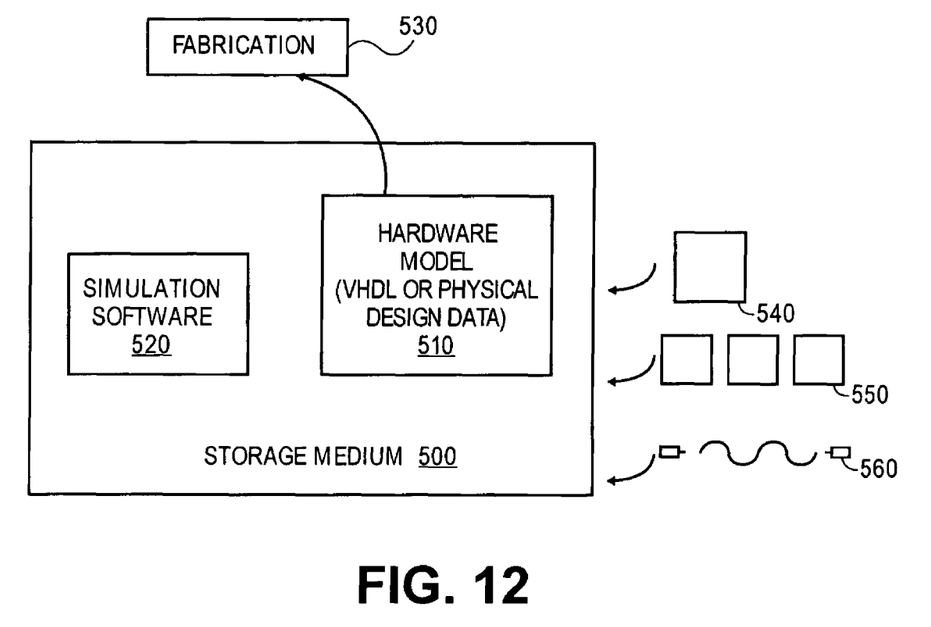
FIG. 12 is a block diagram illustrating various design representations or formats for simulation, emulation and fabrication of a design using the disclosed techniques.

FIG. 12 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite 530 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the systems 100, 200 and 300 include a single CPU (102, 202, 302) for other embodiments, a multiprocessor system (where one or more processors may be similar in configuration and operation to the CPUs 102, 202 and 302 described above) may benefit from the content protect using a one-way buffer of various embodiments. In one embodiment, systems 100, 200 and 300 may include a single CPU (102, 202, 302) with multiple processor cores. The multiple processor cores may each include an integrated memory controller or a single memory controller may be shared by the multiple processor cores. Further, a different type of system or a different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments as defined by the following claims.

What is claimed is:

1. A method, comprising:
    detecting a transfer of decrypted content directed to an assigned portion of a memory address space;
    redirecting the transfer of the decrypted content to a buffer within a reserved range of memory if the assigned portion of the memory address space is mapped to the reserved range of memory; and
    transferring content from the buffer to a peripheral device according to a direct memory access request issued by the peripheral device if the peripheral device is assigned read-only access to the reserved range of memory, wherein access to the buffer within the reserved range of memory consists of write-only access by only a host processor and read-only access by only the peripheral device.

2. The method of claim 1, wherein redirecting the transfer of the decrypted content further comprises:
    encrypting the content associated with the transfer; and
    storing the encrypted content into the buffer within the reserved range of memory.

3. The method of claim 2, wherein encrypting further comprises:
    generating a session key to encrypt the content, such that the session key does not require storage with a non-volatile storage.

4. The method of claim 1, wherein transferring the content from the buffer further comprises:
    decrypting content read from the buffer within the reserved range of memory prior to transferring of the content to a device driver of the peripheral device.

5. The method of claim 1, wherein the content is digital audio content.

6. A system comprising:
    a peripheral device;
    a host processor to decrypt received encrypted content for playback by the peripheral device and to issue a programmed I/O transfer of the decrypted content to the peripheral device; and
    a chipset coupled between the host processor and the peripheral device, the chipset including a memory controller to redirect the programmed I/O transfer of the decrypted content to a reserved range of memory assigned to the peripheral device and to transfer content from the reserved range of memory to the peripheral device according to a request issued by the peripheral device, wherein access to the reserved range of memory consists of write-only access by only the host processor and read-only access by only the peripheral device to prohibit illegal copying of the decrypted content.

7. The system of claim 6, wherein the controller is to encrypt the decrypted content prior to storage within the reserved range of memory.

* * * * *